United States Patent
Kaplan et al.

(10) Patent No.: US 12,430,014 B2
(45) Date of Patent: Sep. 30, 2025

(54) ORDERING COLLABORATIVE ACTIONS IN A GRAPHICAL USER INTERFACE

(71) Applicant: INTERNATIONAL BUSINESS MACHINES CORPORATION, Armonk, NY (US)

(72) Inventors: Keith Kaplan, Long Island City, NY (US); Jayanth Krishnan, Mahopac, NY (US); Paul R. Bastide, Ashland, MA (US); Krishnan Sugavanam, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 17/357,480

(22) Filed: Jun. 24, 2021

(65) Prior Publication Data

US 2022/0413690 A1    Dec. 29, 2022

(51) Int. Cl.
*G06F 3/04845* (2022.01)
*G06F 7/24* (2006.01)
*H04L 51/52* (2022.01)

(52) U.S. Cl.
CPC ............ *G06F 3/04845* (2013.01); *G06F 7/24* (2013.01); *H04L 51/52* (2022.05)

(58) Field of Classification Search
CPC ...... G06F 3/04845; G06F 3/0484; G06F 7/24; G06F 7/22; H04L 51/32
USPC ........................................................ 715/764
See application file for complete search history.

(56) References Cited

U.S. PATENT DOCUMENTS

| | | | |
|---|---|---|---|
| 7,640,174 B2 | 12/2009 | Surpin et al. | |
| 8,527,327 B1 * | 9/2013 | Lawrence | G06Q 10/103 705/7.41 |
| 8,543,438 B1 * | 9/2013 | Fleiss | G06Q 10/0631 705/7.17 |

(Continued)

FOREIGN PATENT DOCUMENTS

| | | | | |
|---|---|---|---|---|
| EP | 3312784 A1 * | 4/2018 | ........... | G06F 3/0484 |
| JP | 2011095917 A * | 5/2011 | | |

OTHER PUBLICATIONS

Zhang, et al., "Design of an Adaptive Human-Machine System Based on Dynamical Pattern Recognition of Cognitive Task-Load", Frontiers in Neuroscience, vol. 11, Article 129, Mar. 17, 2017, pp. 1-18. (Year: 2017).*

(Continued)

*Primary Examiner* — Hwei-Min Lu
(74) *Attorney, Agent, or Firm* — CHIP LAW GROUP

(57) ABSTRACT

A computer-implemented method for organizing tasks presented on a graphical user interface of a computer hardware system for a user includes the following operations. An electronic message associated with a collaborative messaging application executing with the computer hardware system is received. A first collaboration having one or more collaborative tasks is identified from the electronic message. A need-for-action, a time-to-act, and a time-to-complete are determined for the first collaboration. A moving average for the first collaboration is adjusted based upon the need-for-action, the time-to-action, and a time-to-complete. The presentation of the first collaboration within the graphical user interface is altered based upon the moving average.

18 Claims, 6 Drawing Sheets

(56) References Cited

U.S. PATENT DOCUMENTS

| | | | |
|---|---|---|---|
| 8,826,284 B1* | 9/2014 | Fuller | G06F 9/5088 |
| | | | 718/103 |
| 9,832,787 B2 | 11/2017 | Broomhall et al. | |
| 10,210,115 B2 | 2/2019 | MacKenzie et al. | |
| 10,282,405 B1 | 5/2019 | Silk et al. | |
| 10,623,359 B1 | 4/2020 | Rosenstein et al. | |
| 10,673,799 B2 | 6/2020 | Costello et al. | |
| 10,887,274 B2 | 1/2021 | Anderson et al. | |
| 2005/0229151 A1* | 10/2005 | Gupta | G06Q 10/06 |
| | | | 717/101 |
| 2008/0126951 A1 | 5/2008 | Sood et al. | |
| 2013/0179515 A1* | 7/2013 | Chi | H04L 12/1818 |
| | | | 709/206 |
| 2014/0219436 A1* | 8/2014 | Kosiba | G06Q 30/0202 |
| | | | 379/265.02 |
| 2014/0236885 A1 | 8/2014 | Muller et al. | |
| 2015/0052177 A1 | 2/2015 | Roseman et al. | |
| 2016/0162478 A1* | 6/2016 | Blassin | G06Q 10/063112 |
| | | | 706/12 |
| 2016/0224939 A1* | 8/2016 | Chen | G06Q 10/06311 |
| 2017/0024248 A1* | 1/2017 | Roth | G06F 9/46 |
| 2017/0193425 A1* | 7/2017 | Roman | H04L 51/224 |
| 2017/0372253 A1 | 12/2017 | Nandi et al. | |
| 2018/0219817 A1 | 8/2018 | Zang et al. | |
| 2019/0327185 A1* | 10/2019 | Hassan | H04L 43/0876 |
| 2019/0391861 A1 | 12/2019 | Emerick et al. | |
| 2020/0045115 A1 | 2/2020 | Griffin | |
| 2020/0145465 A1 | 5/2020 | Al-Mehdar et al. | |
| 2020/0342420 A1* | 10/2020 | Zatta | B60S 5/00 |
| 2021/0150454 A1* | 5/2021 | Lereya | G06F 3/0482 |

OTHER PUBLICATIONS

Tagg, R, et al., "Recognizing work priorities and tasks in incoming messages through personal ontologies supplemented by lexical clues," In ECIS 2009, pp. 1271-1282.

Gil, Y. et al., "Social task networks: Personal and collaborative task formulation and management in social networking sites," In 2010 AAAI Fall Symposium Series, Nov. 1, 2010, 6 pg.

Bellotti, V. et al., "Taking email to task: the design and evaluation of a task management centered email tool," In Proceedings of the SIGCHI Conference on Human factors in Computing Systems, Apr. 5, 2003, pp. 345-352.

Mell, P. et al., The NIST Definition of Cloud Computing, National Institute of Standards and Technology, U.S. Dept. of Commerce, Special Publication 800-145, Sep. 2011, 7 pg.

"IBM Natural Language Classifier," [online] Watson Natural Language Classifier, IBM Corp. [retrieved Jun. 18, 2021], retrieved from the Internet: <https://www.ibm.com/watson/services/natural-language-classifier/>, 15. pg.

Tagg, R., "Task Integration for Knowledge Workers: Especially Those Involved in Multiple Collaborative Activities," SciTePress © 2007, In Proceedings of the 4th International Workshop on Computer Supported Activity Coordination, pp. 3-12.

"Fundamentals—Gnip console", X Developer Platform, Mar. 28, 2025, 10 pages, https://docs.x.com/x-api/enterprise-gnip-2.0/fundamentals/overview.

"Meta Webhooks for Messenger Platform", Mar. 28, 2025, 14 pages, https://developers.facebook.com/docs/messenger-platform/webhooks.

"Page Feed", Graph API Version, Mar. 28, 2025, 20 pages, https://developers.facebook.com/docs/graph-api/reference/v3.2/page/feed.

"Push Technology", Wikipedia—The Free Encyclopedia, Mar. 28, 2025, 07 pages, https://en.wikipedia.org/wiki/Push_technology.

"SaneBox, What is SaneBox and how does it work?" [online] SaneBox, retrieved from the Internet: Apr. 22, 2025, 1 pgs, <https://www.sanebox.com/help/142-what-is-sanebox-and-how-does-it-work>.

Bellotti et al., "TV-ACTA: embedding an activity-centered interface for task management in email," Conference: CEAS 2007—The Fourth Conference on Email and Anti-Spam, Aug. 2-3, 2007, pp. 11.

* cited by examiner

ORDERING COLLABORATIVE ACTIONS IN A GRAPHICAL USER INTERFACE

BACKGROUND

The present invention relates to graphical user interfaces (GUIs) used with collaborative messaging applications, and more specifically, to altering the presentation of collaborative tasks in the GUIs based upon collaboration capacity.

Online social networking computer systems and computer-implemented collaboration tools are used to connect people and information in organized and logical ways to facilitate the sharing and processing of information between users. Many types of specialized computer systems have been devised to perform these functions. More recognizable of these specialized computer systems include email systems, text messaging, aggregated social media feeds, activity stream, timeline, and profile. The mechanisms associated with these specialized computer systems enable users to rapidly share information with other users as well to facilitate collaboration between users. As used herein, "collaboration" refers to the process of facilitating multiple users create and implement a computer-implemented workflow (i.e., one or more "collaborative tasks") to achieve some common goal. As used herein, as "collaboration system" refers a specialized information technology (IT) used to implement collaboration among users.

A problem associated with the rapid sharing of information is that a user can be overwhelmed by the volume of information being shared. In so doing, the user may overlook collaboration opportunities—some of which are of a time-sensitive nature. To address this problem, a number of technical solutions have been implemented. For example, common email systems have the ability for a sender to associate an urgency with a particular message, which would alert a reader to a message that should take higher precedence over other messages. Other technical solutions include having a message filter in which messages can be filtered based upon a number of different factors, for example, the name of the sender and keywords in the header and/or body of the message.

However, the prior technical approaches merely look to identify (and prioritize) what needs to get done (i.e., collaborative tasks) and to adjust the presentation of these collaborative tasks within a graphical user interface associated with the collaboration systems. These technical approaches fail to consider the capability of the collaborators to engage in the collaborations and that presenting too many collaborative tasks can lead to reduced efficiency in the performance of the individual collaborations.

SUMMARY

A computer-implemented method for organizing tasks presented on a graphical user interface of a computer hardware system for a user includes the following operations. An electronic message associated with a collaborative messaging application executing with the computer hardware system is received. A first collaboration having one or more collaborative tasks is identified from the electronic message. A need-for-action, a time-to-act, and a time-to-complete are determined for the first collaboration. A moving average for the first collaboration is adjusted based upon the need-for-action, the time-to-action, and a time-to-complete. The presentation of the first collaboration within the graphical user interface is altered based upon the moving average.

A computer hardware system for organizing tasks presented on a graphical user interface of the computer hardware system for a user includes the following operations includes a hardware processor configured to perform the following executable operations. An electronic message associated with a collaborative messaging application executing with the computer hardware system is received. A first collaboration having one or more collaborative tasks is identified from the electronic message. A need-for-action, a time-to-act, and a time-to-complete are determined for the first collaboration. A moving average for the first collaboration is adjusted based upon the need-for-action, the time-to-action, and a time-to-complete. The presentation of the first collaboration within the graphical user interface is altered based upon the moving average.

A computer program product includes a computer readable storage medium having stored therein program code for organizing tasks presented on a graphical user interface of a computer hardware system for a user includes the following operations. The program code, which when executed by the computer hardware system, cause the computer hardware system to perform the following. An electronic message associated with a collaborative messaging application executing with the computer hardware system is received. A first collaboration having one or more collaborative tasks is identified from the electronic message. A need-for-action, a time-to-act, and a time-to-complete are determined for the first collaboration. A moving average for the first collaboration is adjusted based upon the need-for-action, the time-to-action, and a time-to-complete. The presentation of the first collaboration within the graphical user interface is altered based upon the moving average.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1A:
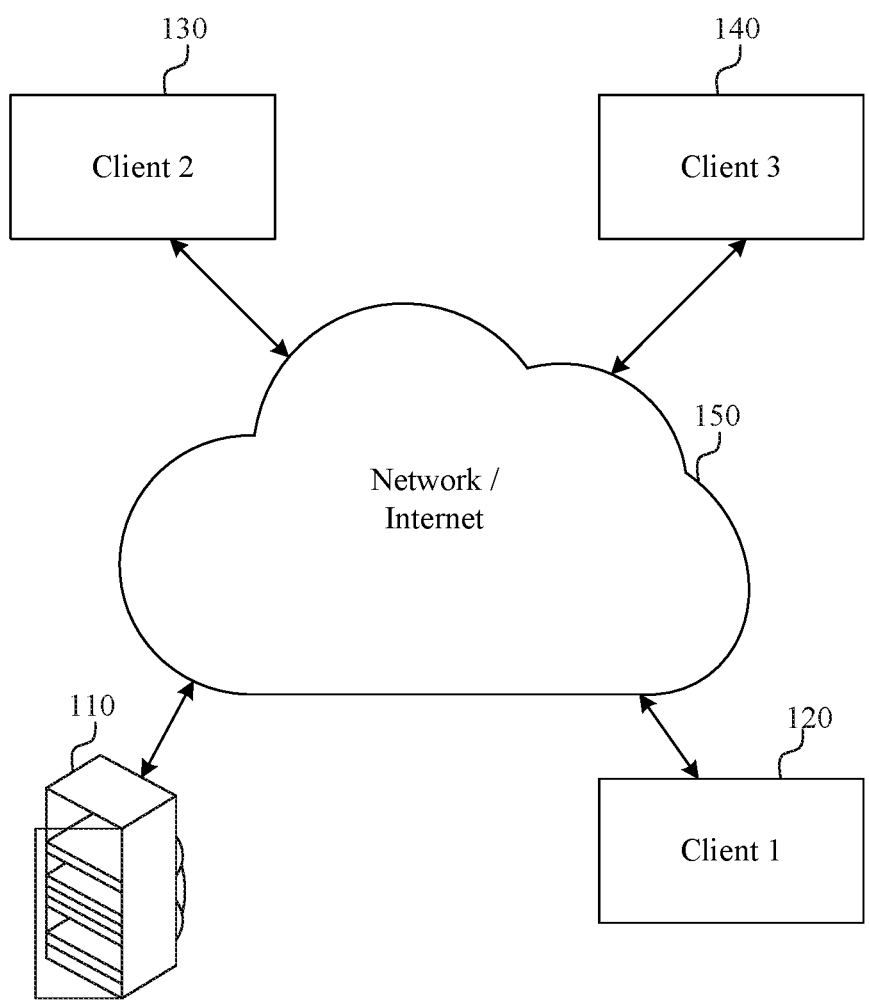
FIGS. 1A, 1B are a block diagram schematically an architecture for a collaborative management system according to an aspect of the present invention.
Figure 1B:
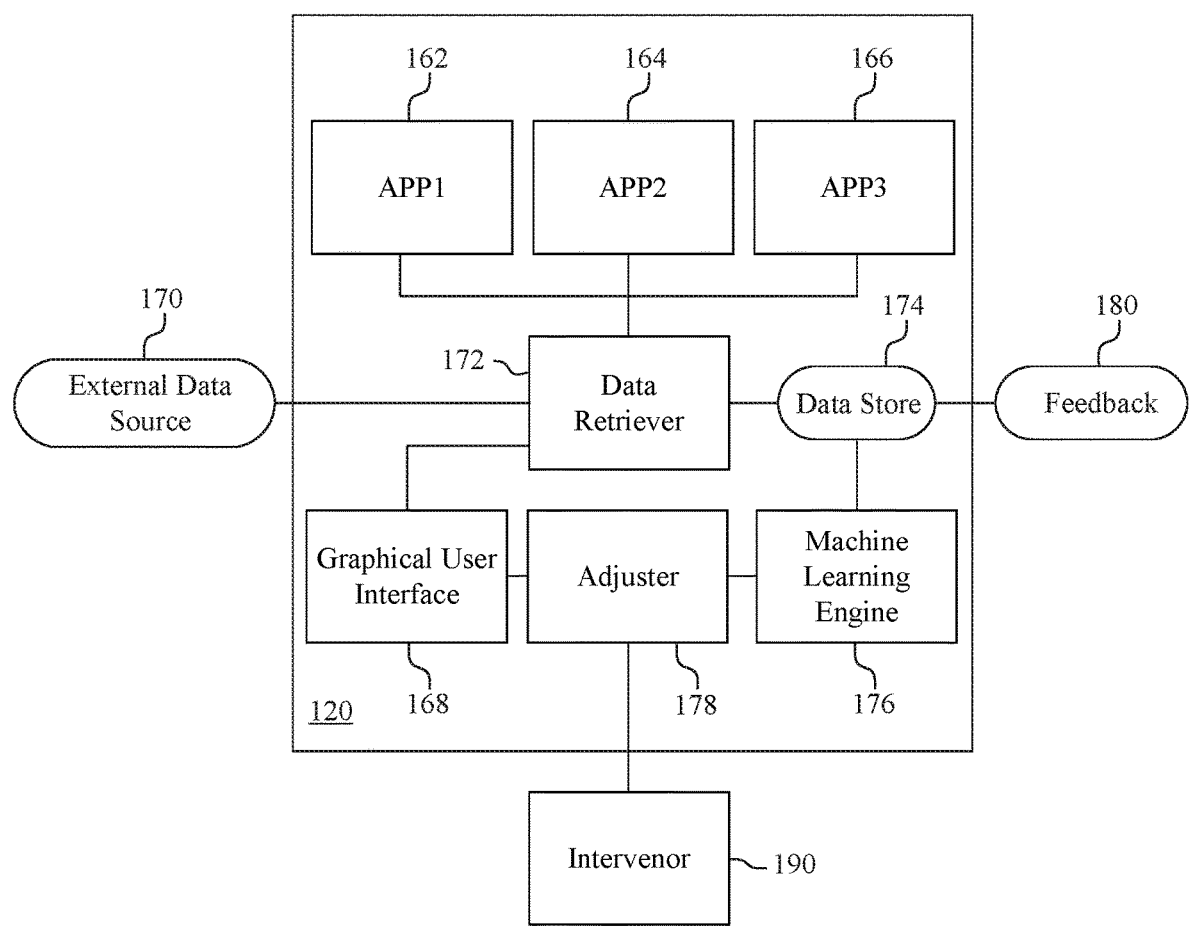
Figure 2:
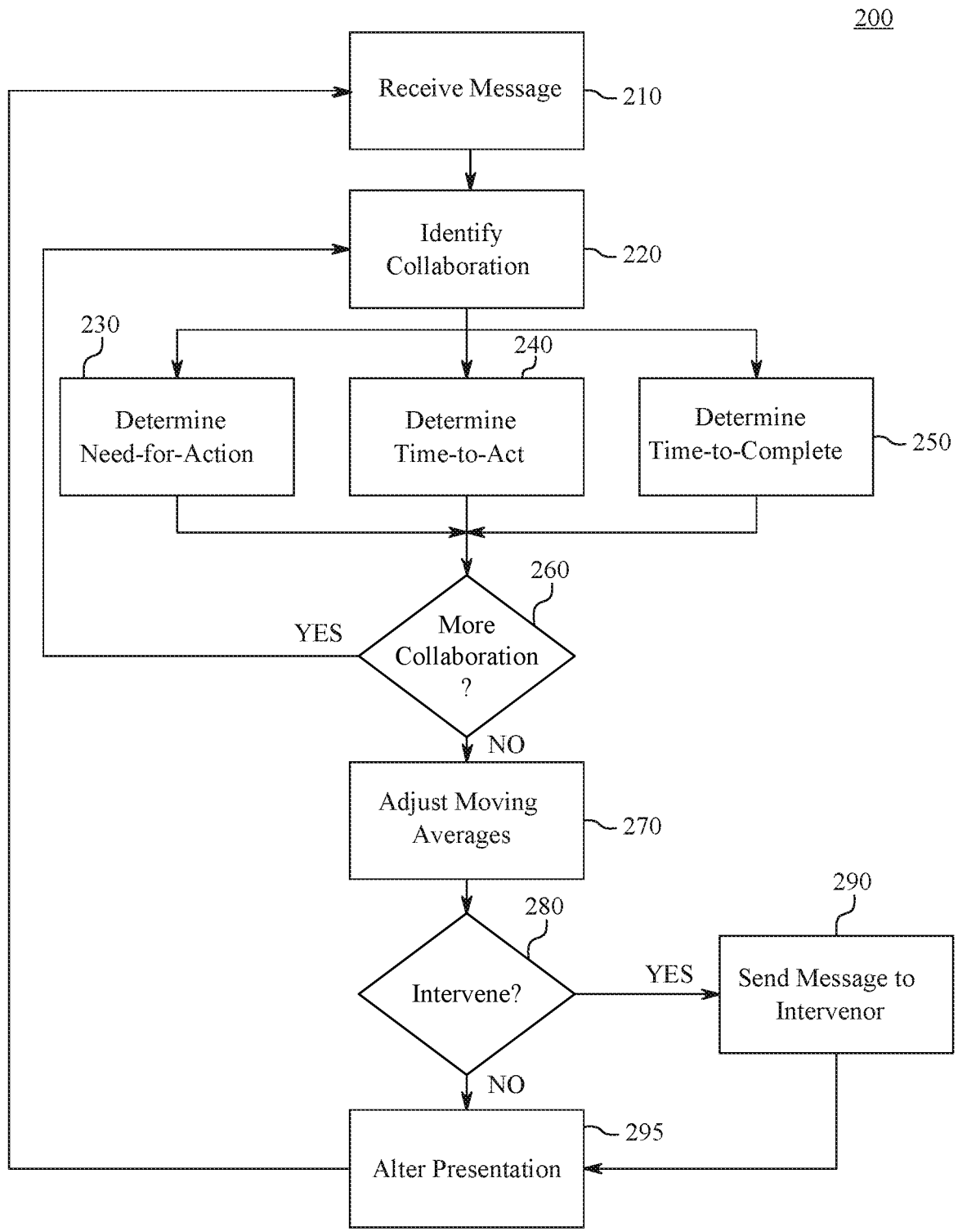
FIG. 2 is a block diagram illustrating an example method using the architecture of FIGS. 1A, 1B.

Reference is made to FIGS. 1A-1B and FIG. 2, which respectively illustrate an architecture 100 and methodology 200, collectively referred to as the collaborative management system, for modifying the presentation of messages/collaborative tasks on a graphical user interface 168 of a client computer 120. The client computer 120 includes one or more collaborative applications (APP1, APP2, APP3) 162, 164, 166 that are used to generate and display collaborative tasks. The collaboration applications 162, 164, 166 can also be configured to receive electronic messages (hereinafter referred to as "messages") that can be subsequently displayed to a user of the client computer 120 via the graphical user interface 168. The graphical user interface 168 can be configured to display collaborative tasks and messages from multiple ones of the collaboration applications 162, 164, 166. Alternatively or in addition to, multiple (not shown) graphic user interfaces 168 can respectively be associated with a single one of the collaboration applications 162, 164, 166.

The collaborative management system is not limited as to types of particular collaborative messaging applications 162, 164, 166. Examples of these types of collaborative messaging applications 162, 164, 166 include, but are not limited to, email applications, calendaring applications, social media applications, collaboration applications, and text messaging applications among others. Although discussed as being part of the client 120, one or more of the functional computer modules 172, 174, 176, 178 can be disposed within a message server 110 that is connected to the client computer 120 via a network/internet 150.

In 210, a data retriever 172 receives messages associated with the collaborative messaging applications 162, 164, 166 within the client computer 120 from one or more other client computers 130, 140 and/or other external computer systems (not shown). The manner in which the messages are received is not limited to a particular technique. For example, one technique involves received messages that are pushed to the client computer 120. For example, a subscriber (e.g., the user of client computer 120) can identify a topic or person of interest using an external application such as a social media API aggregator or IBM Connections Compliance feeds. The collaborative management system receives, via the data receiver 172, a stream of messages and/or a batch of messages sent on a periodic basis (e.g. 30 messages in 15 minutes, 1 message in 15 minutes, etc.). Another alternative push mechanism includes application-specific push notifications. Pull feed is an alternative to a push mechanism for receiving messages. In a pull feed, the data retriever can poll an external data source 170, such as a RSS feed or an application programming interface (API) of an external application, for messages. As yet an another alternative, the data retriever 172 can be configured to capture data on the GUI 168. For example, the document object model associated with the data on the screen can be scraped for elements of interest. Although the "messages" described herein are generally user-readable text messages such as emails and texts, the collaborative management system is not limited in this message. For example, other types of messages handled by the collaborative management system can include messages such as a calendar invite and a to do list. In certain aspects, these types of messages are those that can be aggregated across different applications and displayed in a collaborative interface, such as the graphical user interface 168.

By way of example, APP1 162 may be an email client that has 25 emails within the inbox, APP2 164 may be a calendaring application with 4 pending appointments for the day, and APP3 166 may be a file and messaging sharing collaborative application that has 5 open cases.

Once the data retriever 172 retrieves the messages, information about these messages can be stored within a data store 174. Examples of information that can be stored and associated with a particular message include but are not limited to: message details such as body, subject, metadata, etc.; one or more topic concepts/categories of the message (e.g., Concept-1, Concept-2, Concept-3); a unique message identifier that can be generated or extracted from the message; a conversation identified that can be generated through membership lists or extracted from the message; access control that indicates a membership list of the conversation; an owner/author of the message if known or otherwise indicated as unknown (e.g., if the user leaves the company); a location of the user (e.g., GPS, longitude/latitude, region, etc.), which can be used to determine user proximity; the assigned company or group (e.g., tenant), which can be used to shard the data in a particularly controlled data store; an identification that the message was the end of a conversation (i.e., a terminal message); and participation metrics such as views, reply-marks, read-marks, and like/up-vote data.

The data in the data store 174 can be also be updated. For example, if metadata associated with the message is updated, then this updated data can be propagated to the data store 174. As another example, if a message is marked as read or the conversation (e.g., a series of interconnected messages) associated with the message is marked as completed, this information can also be stored. Other examples of data that can be stored includes whether the message or collaborative task associated with the message is not updated for a period of time (e.g., 15 days), the message or collaborative task can be marked as completed (or abandoned) at the time of the last interaction by the user with the message or collaborative task.

In 220, a first collaboration having one or more collaborative tasks associated therewith is identified from the corpus of received messages. Pending collaborations can include but are not limited to messages, reports, and calls for aid. Other examples include online reviews, approvals, and feedback. In certain aspects, the pending collaborations are a task that includes a call to action.

The collaborative management system is not limited in the manner by which a collaboration (and associated collaborative tasks) is identified from the messages. For example, the machine learning engine 176 can perform similarity matching between contents of the messages to previously-stored collaborations found within the data store 174. Based upon the similarity matching, a particular type of collaboration can be identified as well as one or more collaborative tasks associated with the collaboration. As another alternative, the message(s) may explicitly identify the collaboration and/or one or more of the collaborative tasks. The machine learning engine 176 can also implicitly identify the collaboration and/or one or more of the collaborative tasks from the message(s). For example, the machine learning engine may include a natural language processor (NLP) capable of identifying certain N-Grams (e.g., "procedure-x" and "needs your signoff") and/or keywords (e.g., a particular project name or user name or position such as a "manager") that indicate the existence of a collaboration.

The machine learning engine 176 can use real-time data retrieved from one or more of the applications 162, 164, 166 to identify collaborations (and associated collaborative tasks). For example, if APP1 was 162 was an audio/video messaging application, the machine learning engine 176 could extract tasks from a natural language analysis of the audio.

In 230, a determination is made for the identified collaboration and by the machine learning engine 176 of a need-for-action. As used herein, a "need-for-action" is a collaborative task without which the collaboration cannot proceed (or progress is hampered) within some predetermined period of time. For example, if a particular collaboration requires three separate collaborative tasks (A, B, C), but collaborative tasks B and C are dependent up the completion of collaborative task A, then the machine learning engine 176 may designate a need-for-action regarding collaborative task A. Additionally, to the extent that multiple need-for-action are identified, the machine learning engine 176 can generate relative priorities amongst the multiple need-for-action.

The machine learning engine 176 can access historical data stored within the data store 174 (or other appropriate storage) to determine the relative importance of each collaborative task to both identify a need-for-action and to prioritize the need-for-action based upon a similar, prior collaborations. For example, a collaborative task having a closer deadline may be designated with a higher priority by the machine learning engine 176. As another example, if a particular collaborative task has a greater number of stakeholders (e.g., dependencies), then that particular collaborative task may be designed with a higher priority.

In 240, a determination is made for the identified collaboration and by the machine learning engine 176 of a time-to-act. As used herein, a "time-to-act" is an optimal time for the user to begin performance a particular collaborative task associated with the identified collaboration. The collaborative task could be, for example, the performance of a particular collaborative task such as engaging in an online group meeting or the generation of a particular email/document. Like with the identification of the need-for-action, the machine learning engine 176 can access historical data stored within the data store 174 (or other appropriate storage) to identify an optimal time to begin performance of the collaborative task based upon the historical data associated with a similar, prior collaboration. Alternatively, in certain instances, the time-to-act may be deadline driven. Accordingly, the optimal time can be based upon a deadline as well as an expected time-to-complete the particular collaborative task. Additionally, the deadline can be based upon other collaborative tasks with which the particular collaborative tasks is associated. In addition to a particular time, the time-to-act can be presented, for example, as optional, required, or overdue.

In 250, a determination is made for the identified collaboration and by the machine learning engine 176 of a time-to-complete. As used herein, a "time-to-complete" is an amount of time for the user to complete a particular collaborative task associated with the identified collaboration. In certain aspects, the time-to-complete is an estimate determined from past task execution time. While the time-to-complete may be an expert-determined value, like identifying the need-for-action, the machine learning engine 176 can access historical data stored within the data store 174 (or other appropriate storage) to generate the time-to-complete the collaborative task based upon the historical data associated with a similar, prior collaboration. The machine learning engine 176 can also use information associated with the efficiency/productivity of a particular user and/or set of users to determine the appropriate amount of collaboration to complete performance of the collaborative task. These inputs include, but are not limited to, deadlines identified within the message, competing priorities among collaborative tasks, time taken to perform similar collaborative task in the past, and data retrieved from IOT (Internet-of-Things) devices including, for example, sleeping patterns, dietary patterns, and heart rate.

For each collaborative task that is associated with the identified collaboration, the machine learning engine 176 can determine how much collaborative effort (e.g., number of meetings or number of hours working within a collaboration application) is needed to perform the action/task. The machine learning engine 176 can also determine a number and identity of stakeholders, aside from the user, that will be needed to be involved in completing the collaborative task along with how much collaboration effort is needed from each stakeholder.

After a collaborative task has been concluded, one or more of the stakeholders can assess the utility of the collaboration as feedback 180. The machine learning engine 176 can take use this feedback 180 to modify/revise weights with the model(s) used within the machine learning engine 176. The machine learning engine 176 can also use the feedback 180 to weight or block other collaborations from the moving average and shift the current view in the index of set of collaborations. As an example, the machine learning engine 176 can be configured to determine moving averages by collaboration type and determine what collaboration types tend to take the most effort to resolve or prevent blockers in future collaboration. The machine learning engine 176 can adjust the weighting based upon how the collaboration was created. For example, a collaborative task generated from a manager or from someone of higher leadership role can receive a higher priority.

In 260, operations 220-250 are performed until all collaborative tasks associated with the messages are identified.

In 270, baseline values for each of the identified collaborative tasks are determined. The baseline value can be determined for all of the collaborative tasks associated with the collaboration and/or for each collaborative task. Although not limited in this manner, the baseline values can reflect an amount of time needed to perform a particular collaborative task. The collaboration management system is not limited in the manner by which these baseline values can be determined. For example, these baseline values can be determined based upon historical data within the data store 174 regarding comparable collaborations and/or collaborative tasks. Alternatively, the baseline values can be based upon a rule set that associates known collaborative tasks with predefined baseline values. Additionally, the baseline values can be modified based upon an efficiency value associated with the particular user. For example, depending upon the collaborative task, one user (e.g., User A) may be have a higher efficiency value than another user (e.g., User B). The baseline value can reflect the capacity of the user to perform the collaborative tasks assigned to the user.

Over time, the baseline value for a collaborative task can change based upon certain data inputs used to determine the baseline value also changing over time. These data inputs include data determined from the need-for-action, the time-to-action, and the time-to-complete. Examples of data inputs used to determine the baseline value include the number of total pending collaborative tasks for a user as well the time-to-complete for each collaborative task. Other data inputs include the efficiency value associated with the particular user as well as any pending collaborative tasks that have been completed since the last time the baseline value was determined. As the baseline value changes, moving averages for this baseline value can be generated. The moving averages are not limited as to a particular time frame for the moving averages are calculated. For example, the moving averages could be calculated daily. Alternatively, the moving averages can be calculated using a time period input by the user over a particular time period. As another example, the moving averages can be calculated on a 90-minute rolling window using all available data inputs within a selected time window. As yet another example, the moving average can be determined by using weighted moving averages where input data is taken from a specific time range, such as a previous seven days. Also, as collaborative tasks are completed, measured by using the time-tocomplete and time-to-act inputs, they may be excluded out of the moving average calculation window. While the moving average may be determined for a particular user, in certain aspects, the moving average can also be determined for a particular team (i.e., a predefined collection of users/stakeholders) or an organization.

In 280, an automated and real-time determination is made by the adjuster 178 whether to intervene in the collaborative tasks assigned to the user. Although not limited as to the particular manner by which this accomplished, in certain aspects, a determination to intervene is based upon one or more of the moving averages exceeding a predetermined threshold over a predetermined period of time. Additionally, more than one predetermined threshold can be evaluated for differing periods of time. For example, one predetermined threshold may be used for a 2 hour period whereas another predetermined threshold may be used for a 6 hour period. The predetermined threshold(s) can be manually or automatically set.

In 290, based upon a decision by the adjuster 178 to intervene, an electronic message is sent to an intervenor 190. Although not limited in this manner, the intervenor 190 can be a manager or an automated workflow distributor that can allocate more resources/support to the action/tasks assigned to the user and/or reallocate certain of those collaborative tasks to another user.

In 295, each collaborative moving average is evaluated against some predetermined threshold. A threshold can be determined for collaborator, for example, through qualitative feedback surveys. Additional thresholds can be established when a particular collaborator performance is over-committed and tasks are not being completed as required. In addition to personalized thresholds, an organization can choose to create standardized threshold, which may or may not be adjusted for certain individuals.

If the collaborative moving average is below the threshold, then no action is taken and the collaborative management system can proceed to evaluate new messages as there are received in 210. However, if the collaborative moving average is higher than the predetermined threshold then presentation of collaborative tasks in the graphical user interface 168 is adjusted, such as by reordering the presentation of the collaborative tasks, altering collaborative tasks, and/or removing certain collaborative tasks. In this manner, the user's focus can be directed to collaborative tasks determined to more conducive to productivity. This can be accomplished, for example, by limiting a number of simultaneous collaborations being presented to a user.

The following are illustrative examples of how the presentation of collaborative tasks can be modified within the GUI 168 and are not intended to be limiting. As one example, certain collaborative tasks (e.g., meetings) that have been determined to be a higher priority can be moved to earlier in the day. As another example, a 5-hour meeting unstructured meeting intended to address three separate items can be re-presented, in a calendaring application, as multiple serial meetings that respectively address each of the three items. Additionally, a determination may be made that certain of the participants required for some of the serial meetings are not required for all of the meetings. In this manner, the 5-hour meeting can be segmented for the participants as well as having certain segments not be displayed in the calendaring application for certain participants.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

The communication network 150 is the medium used to provide communications links between various devices and data processing systems connected together within the API system 100/computing environment (or network data processing system, etc.) 100. The communication network 150 may include connections, such as wire, wireless communication links, or fiber optic cables. The communication network 150 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

Figure 3:
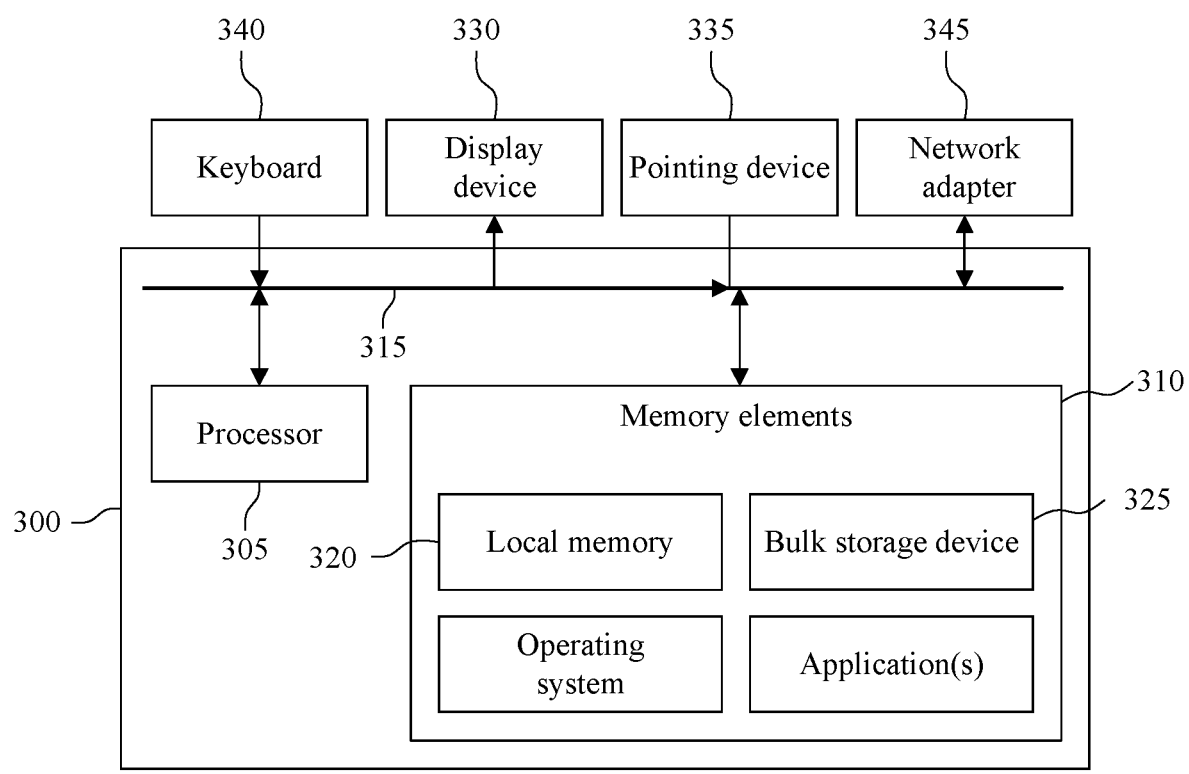
FIG. 3 is a block diagram illustrating an example of computer hardware system for implementing the collaborative management system of FIGS. 1A, 1B.

FIG. 3 is a block diagram illustrating example architecture for a data processing system 300 for executing the collaborative management system. The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification. For example, the data processing system 300 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 300 also can include one or more cache memories (not shown) that provide temporary storage of at least some program code in order to reduce the number of times program code must be retrieved from the local memory 320 and/or bulk storage device 325 during execution.

Input/output (I/O) devices such as a display 330, a pointing device 335 and, optionally, a keyboard 340 can be coupled to the data processing system 300. The I/O devices can be coupled to the data processing system 300 either directly or through intervening I/O controllers. For example, the display 330 can be coupled to the data processing system 300 via a graphics processing unit (GPU), which may be a component of the processor 305 or a discrete device. One or more network adapters 345 also can be coupled to data processing system 300 to enable the data processing system 300 to become coupled to other systems, computer systems, remote printers, and/or remote storage devices through intervening private or public networks. Modems, cable modems, transceivers, and Ethernet cards are examples of different types of network adapters 345 that can be used with the data processing system 300.

As pictured in FIG. 3, the memory elements 310 can store the components of the collaborative management system of FIGS. 1A, 1B. Being implemented in the form of executable program code, these components of the data processing system 300 can be executed by the data processing system 500 and, as such, can be considered part of the data processing system 300.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
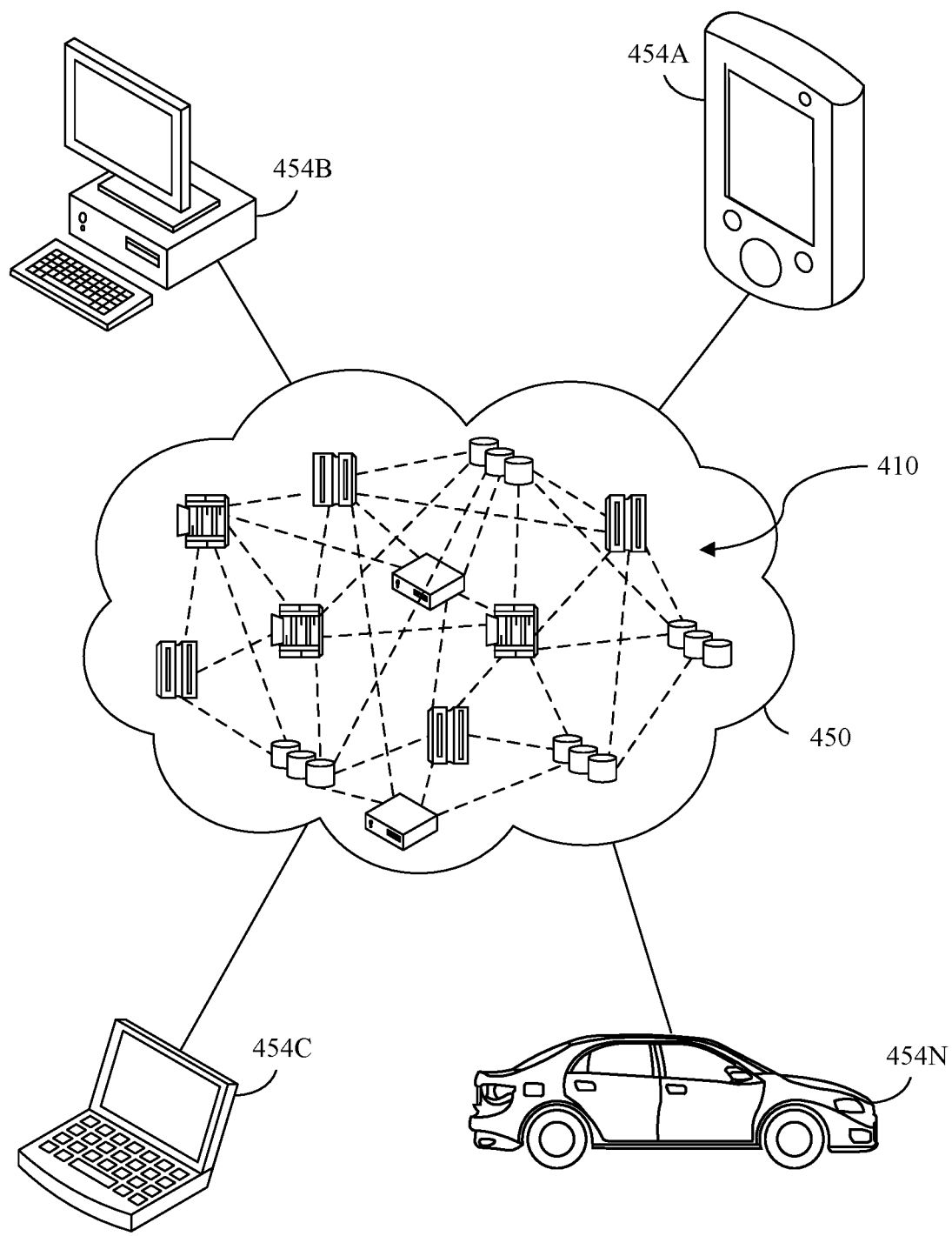
FIG. 4 depicts a cloud computing environment according to an embodiment of the present invention.

Referring now to FIG. 4, illustrative cloud computing environment 450 to be used with the collaborative management system is depicted. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser).

Figure 5:
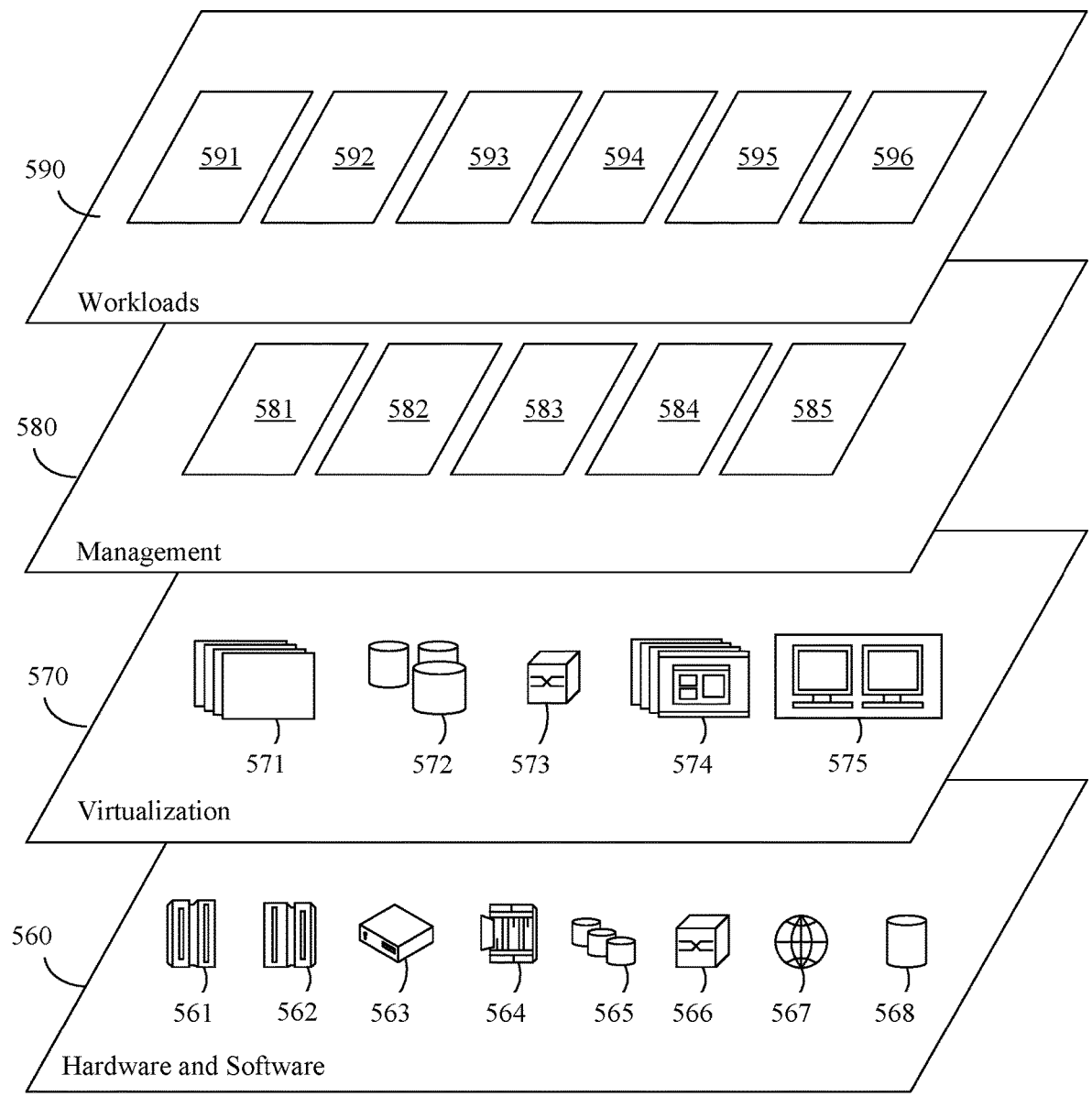
FIG. 5 depicts abstraction model layers according to an embodiment of the present invention.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and operations of the collaborative management system 596.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented method for organizing tasks presented on a graphical user interface of a computer hardware system for a user, comprising:
   receiving an electronic message associated with a collaborative messaging application executing with the computer hardware system;
   identifying, from the electronic message, a first collaboration having one or more collaborative tasks;
   determining, for the first collaboration, a need-for-action within a predetermined amount of time, a time-to-act, and a time-to-complete;
   adjusting a moving average for a baseline value of the first collaboration based upon the need-for-action, the time-to-action, and the time-to-complete;
   altering presentation of the first collaboration within the graphical user interface based upon the moving average, wherein
   the baseline value of the first collaboration reflects an amount of time needed to perform the one or more collaborative tasks of the first collaboration,
   an intervening electronic message is sent to an intervenor based upon a determination that the moving average exceeds a predetermined threshold, and
   the intervenor is an automated workflow distributor having
      a first configuration to allocate more resources to the one or more collaborative tasks, and
      a second configuration to reallocate the one or more collaborative tasks to another user.

2. The method of claim 1, wherein
   the graphical user interface is adjusted by at least one of:
      reordering a graphical presentation of the one or more collaborative tasks,
      altering one or more of the collaborative tasks, and
      removing one or more of the collaborative tasks.

3. The method of claim 1, wherein
   a plurality of collaborations are identified,
   the determining is performed for each of the plurality of collaborations, and
   the adjusting is based upon the plurality of collaborations.

4. The method of claim 1, wherein
   the need-for-action is a particular collaborative task without which the first collaboration cannot proceed.

5. The method of claim 1, wherein
   the time-to-act is an optimal time for the user to begin performance of a particular collaborative task associated with the first collaboration.

6. The method of claim 1, wherein
   the time-to-complete is an amount of time for the user to complete a particular collaborative task associated with the first collaboration.

7. The method of claim 1, wherein
   the moving average is evaluated against different predetermined thresholds respectively associated with different periods of time.

8. A computer hardware system for organizing tasks presented on a graphical user interface of the computer hardware system for a user, comprising:
   a hardware processor configured to perform the following executable operations:
      receiving an electronic message associated with a collaborative messaging application executing with the computer hardware system;
      identifying, from the electronic message, a first collaboration having one or more collaborative tasks;
      determining, for the first collaboration, a need-for-action within a predetermined amount of time, a time-to-act, and a time-to-complete;
      adjusting a moving average for a baseline value of the first collaboration based upon the need-for-action, the time-to-action, and the time-to-complete;
      altering presentation of the first collaboration within the graphical user interface based upon the moving average, wherein
   the baseline value of the first collaboration reflects an amount of time needed to perform the one or more collaborative tasks of the first collaboration,
   an intervening electronic message is sent to an intervenor based upon a determination that the moving average exceeds a predetermined threshold, and
   the intervenor is an automated workflow distributor having
      a first configuration to allocate more resources to the one or more collaborative tasks, and
      a second configuration to reallocate the one or more collaborative tasks to another user.

9. The system of claim 8, wherein
   the graphical user interface is adjusted by at least one of:
      reordering a graphical presentation of the one or more collaborative tasks,
      altering one or more of the collaborative tasks, and
      removing one or more of the collaborative tasks.

10. The system of claim 8, wherein
    a plurality of collaborations are identified,
    the determining is performed for each of the plurality of collaborations, and
    the adjusting is based upon the plurality of collaborations.

11. The system of claim 8, wherein
    the need-for-action is a particular collaborative task without which the first collaboration cannot proceed.

12. The system of claim 8, wherein
    the time-to-act is an optimal time for the user to begin performance of a particular collaborative task associated with the first collaboration.

13. The system of claim 8, wherein
    the time-to-complete is an amount of time for the user to complete a particular collaborative task associated with the first collaboration.

14. The system of claim 8, wherein
    the moving average is evaluated against different predetermined thresholds respectively associated with different periods of time.

15. A computer program product, comprising:
    a computer readable storage medium having stored therein program code for organizing tasks presented on a graphical user interface of a computer hardware system for a user, the program code, which when executed by the computer hardware system, cause the computer hardware system to perform:
  receiving an electronic message associated with a collaborative messaging application executing with the computer hardware system;
  identifying, from the electronic message, a first collaboration having one or more collaborative tasks;
  determining, for the first collaboration, a need-for-action within a predetermined amount of time, a time-to-act, and a time-to-complete;
  adjusting a moving average for a baseline value of the first collaboration based upon the need-for-action, the time-to-action, and the time-to-complete;
  altering presentation of the first collaboration within the graphical user interface based upon the moving average, wherein
the baseline value of the first collaboration reflects an amount of time needed to perform the one or more collaborative tasks of the first collaboration,
an intervening electronic message is sent to an intervenor based upon a determination that the moving average exceeds a predetermined threshold, and
the intervenor is an automated workflow distributor having a first configuration to allocate more resources to the one or more collaborative tasks, and
a second configuration to reallocate the one or more collaborative tasks to another user.

16. The computer program product of claim 15, wherein the graphical user interface is adjusted by at least one of:
  reordering a graphical presentation of the one or more collaborative tasks,
  altering one or more of the collaborative tasks, and
  removing one or more of the collaborative tasks.

17. The computer program product of claim 15, wherein the need-for-action is a particular collaborative task without which the first collaboration cannot proceed,
  the time-to-act is an optimal time for the user to begin performance of the particular collaborative task, and
  the time-to-complete is an amount of time for the user to complete a particular collaborative task associated with the first collaboration.

18. The computer program product of claim 15, wherein the moving average is evaluated against different predetermined thresholds respectively associated with different periods of time.

* * * * *